United States Patent [19]
Bartley et al.

[11] 3,752,927
[45] Aug. 14, 1973

[54] PUBLIC TELEPHONE MOUNTING

[75] Inventors: Keith David Bartley; Fred Arlington Dewhirst, both of Indianapolis, Ind.

[73] Assignee: Bell Telephone Laboratories, Incorporated, Murray Hill, N.J.

[22] Filed: June 28, 1972

[21] Appl. No.: 267,053

[52] U.S. Cl. .................. 179/146 R, 312/223, 52/28
[51] Int. Cl. .................................. H04m 1/11
[58] Field of Search ............... 179/146 R, 178, 179; 52/27, 28; 312/223

[56] References Cited

UNITED STATES PATENTS

| | | | |
|---|---|---|---|
| 2,948,377 | 8/1960 | Kennedy | 179/6.3R X |
| 3,338,002 | 8/1967 | Ericsson et al. | 52/28 |

*Primary Examiner*—William C. Cooper
*Attorney*—W. L. Keefauver

[57] ABSTRACT

The telephone mounting comprises a tubular post including front and back walls spaced from one another. The front wall of the post has an opening therein that conforms to the peripheral configuration of the public telephone for which the mounting is adapted. In addition, the interior of the post includes support means to which the public telephone is secured and blocking means above and below the support means that close off the interior of the post. The distance between the support means and the front wall is such that when the public telephone is secured to the support means, the front wall embraces the public telephone forward of the rear edge of the telephone's front cover. The juncture between the front cover and the rear housing of the telephone is thereby protected from prying tools. Furthermore, the blocking means prevents access through the interior of the post to this juncture, the juncture between the back housing and the support means, and the fasteners used to secure the telephone to the support means.

10 Claims, 9 Drawing Figures

Patented Aug. 14, 1973

3,752,927

3 Sheets-Sheet 3

PUBLIC TELEPHONE MOUNTING

FIELD OF THE INVENTION

This invention relates to the field of public telephone mountings and within that field to vandal resistant mountings.

BACKGROUND OF THE INVENTION

During recent years there has been a rise in the incidence of vandalism of public telephone. As a result, a more vandal resistant telephone, an example of which is disclosed in U.S. Pat. No. 3,142,522 issued to N. R. Hall et al. on July 28, 1964, has been placed into service. The front cover of this telephone mates with its rear housing in an overlapping tongue and groove fashion and is secured to the rear housing by a double locking bar arrangement. However, as the public telephone has become more impervious to previous methods of entry, vandals have resorted to more extreme measures for breaking them open. In addition, they have resorted to detaching the entire telephone from its supporting structure.

SUMMARY OF THE INVENTION

The telephone mounting of the present invention is designed to provide a supporting structure for public telephones that is more vandal resistant than existing telephone mountings and at the same time affords more protection for the telephone than existing telephone mountings.

In one specific embodiment, the telephone mounting comprises a unitary tubular steel post having front and back walls spaced from one another. The front wall has an opening thereon that closely conforms to the peripheral configuration of the public telephone for which the mounting is adapted. To the rear of the opening and intermediate the front and back walls, the post includes a permanently attached support plate to which the public telephone is fastened. The support plate is spaced from the front wall of the post a distance such that when the public telephone is secured to the support plate, the front wall of the post embraces the top, bottom, and sides of the telephone forward of the rear edge of the cover. As a result, the juncture of the cover with the rear housing is not accessible for attack by a crowbar or other prying tool.

Furthermore, the post includes a blocking plate both above and below the opening for receiving the public telephone, and each plate extends transverse to the length of the post and is permanently attached to the post. These blocking plates obstruct access to the juncture between the cover and the rear housing, to the juncture between the rear housing and the support plate, and to the bolts used to secure the rear housing to the support plate. Consequently vandals are prevented from using prying tools or chisels to separate the cover from the rear housing or to detach the telephone from the mounting.

DETAILED DESCRIPTION OF THE INVENTION

Figure 1:
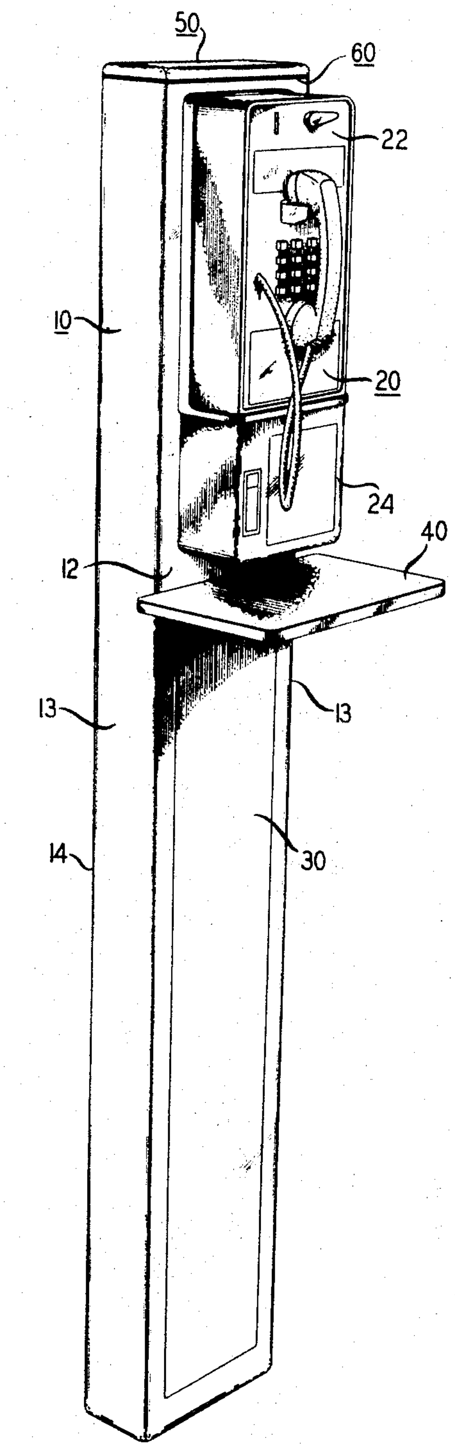
FIG. 1 is a front perspective view of a telephone mounting in accordance with the invention with a public telephone and shelf attached thereto.
Figure 2:
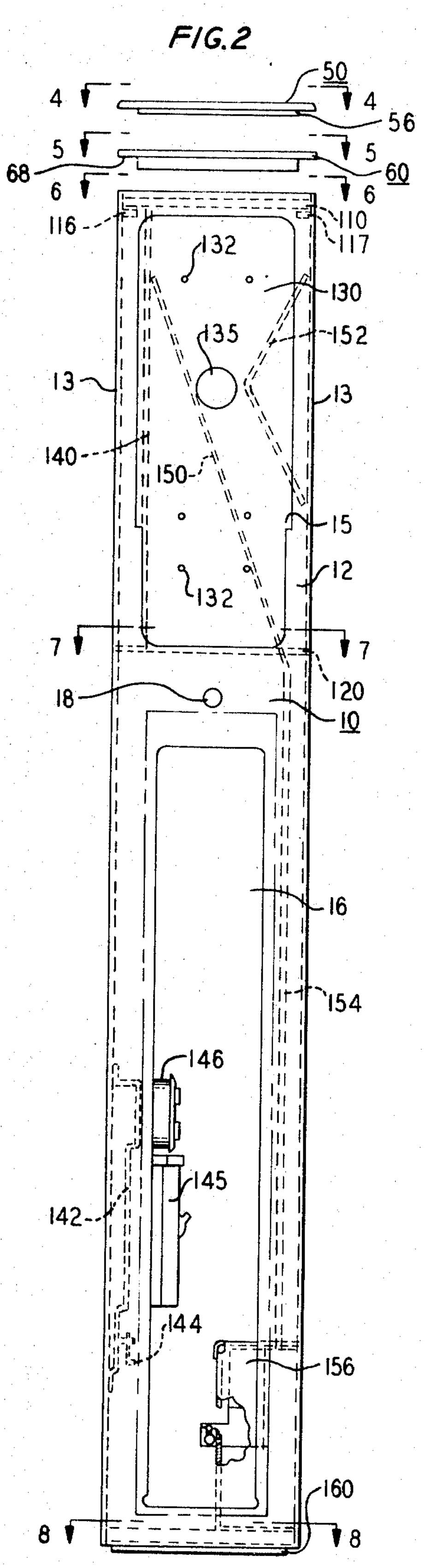
FIG. 2 is an exploded front view of the telephone mounting with the front panel removed from the post.

Referring to FIG. 1 of the drawing, a telephone mounting in accordance with the invention is comprised of a rectangular tubular steel post 10 having a front wall 12, side walls 13, and a back wall 14. As seen in FIG. 2, the front wall 12 has a shaped opening 15 in the upper portion thereof, a rectangular opening 16 in the lower portion thereof, and a circular opening 18 therebetween. A coin or other public telephone 20 is accommodated by the shaped opening 15 while a front panel 30 covers the rectangular opening 16. The circular opening 18 is covered by a simple shelf 40 mounted to the front wall 12 between the telephone 20 and the panel 30 to provide a flat surface for the convenience of the telephone user.

Referring to FIGS. 2, 3, 4 and 5, the upper end of the telephone mounting includes a finishing cap 50 that is fastened to the post 10, a gasket 60 being positioned between the cap and the post. The cap 50 has a multiplicity of counter-bored holes 52 spaced thereabout and a pair of tapped holes 54 and 55 at opposite ends thereof. In addition, the cap 50 has a rectangular spacer 56 depending from its underside. Similarly, the gasket 60 has spaced holes 62, 64, and 65 that are respectively essentially the same size as and located in registration with the holes 52, 54, and 55 in the cap 50. The gasket 60 also has a rectangular hole 66 that is slightly larger than and located in registration with the spacer 56 of the cap 50. Finally, the perimeter of the underside of the gasket 60 is relieved to provide a lip 68 that is slightly deeper than the thickness of the material of the post 10.

Figure 6:
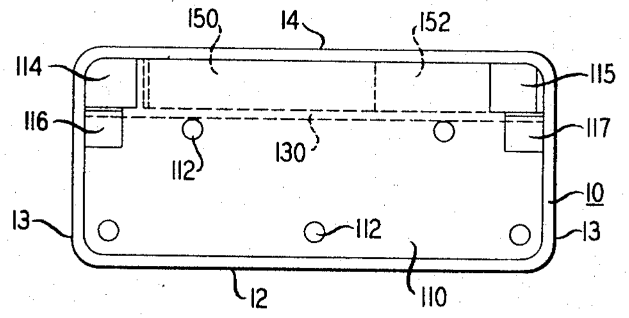
FIG. 6 is a top view taken along line 6—6 of FIG. 2 showing the upper end of the post.

Referring also to FIG. 6, the post 10 includes an upper blocking plate 110 welded within the upper end thereof that has tapped holes 112 located in registration with the holes 52 in the cap 50 and openings 114 and 115 that are respectively in line with the holes 54 and 55 in the cap. The cap 50 is fastened to the post 10 by bolts (not shown) that extend through the holes 52 and 62 of the cap 50 and gasket 60, respectively, and are screwed into the holes 112. The upper blocking plate 110 is recessed from the top of the post 10 a distance such that when the spacer 56 is pressed into engagement with the blocking plate, the gasket 60 is squeezed to approximately half its normal thickness. A good seal is thereby obtained.

The holes 54 and 55 in the cap 50, holes 64 and 65 in the gasket 60, and openings 114 and 115 in the upper blocking plate 110 are used when the telephone mounting is connected to overhead utility lines. Electrical wires from an overhead source are fed through the holes 54 and 64 and the opening 114 in the left side of the telephone mounting, while telephone wires from an overhead source are fed through the holes 55 and 65 and the opening 115 in the right side of the telephone mounting. The openings 114 and 115 respectively communicate with inclined ramps 116 and 117 that assist in directing the wires along particular paths. If one or both of these utilities is not supplied from an overhead source, the associated hole 54 or 55 in the cap 50 is closed by a threaded plug (not shown).

Figure 3:
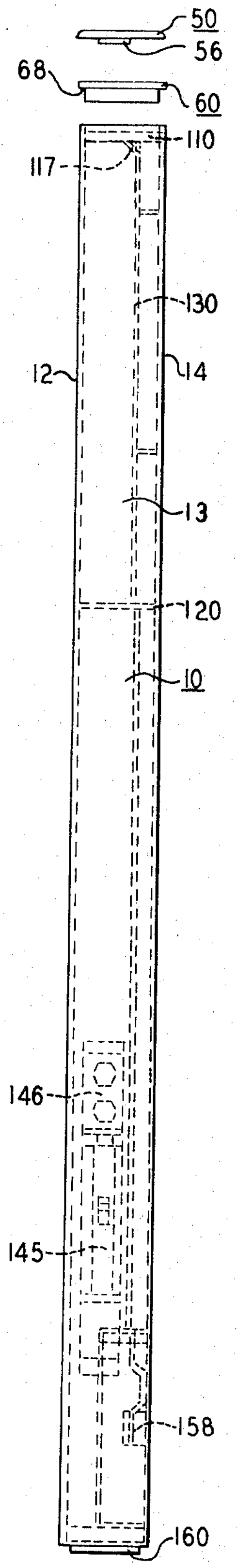
FIG. 3 is an exploded side view of the telephone mounting.
Figure 4:
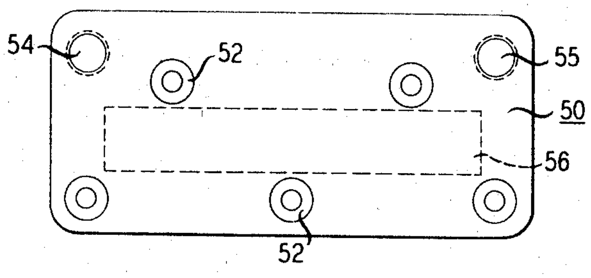
FIG. 4 is a top view taken along line 4—4 of FIG. 2 showing the cap of the telephone mounting.
Figure 5:
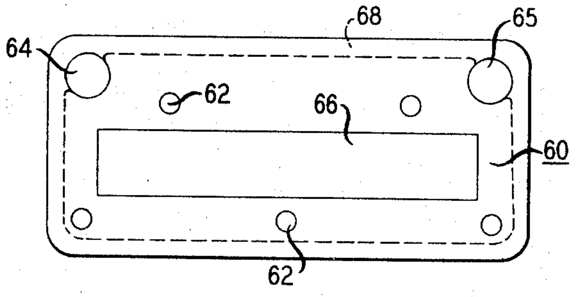
FIG. 5 is a top view taken along line 5—5 of FIG. 2 showing the gasket that fits between the cap and the post.
Figure 7:
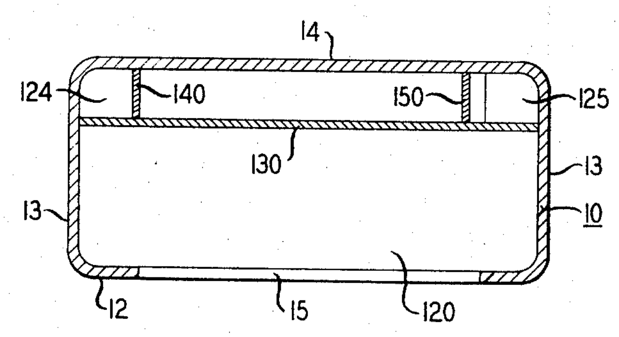
FIG. 7 is a sectional view taken along line 7—7 of FIG. 2 showing the interior construction of the upper end of the post.

Turning now to FIGS. 2, 3, and 7, the post 10 also includes a lower blocking plate 120 welded in place level with the bottom edge of the opening 15 in the front wall 12. Like the upper blocking plate 110, the lower blocking plate 120 closes off all but the back corners of the post 10, openings 124 and 125 being provided in the back corners to respectively permit the passage of electrical and telephone wires therethrough.

A support plate 130 extends between the upper and lower blocking plates 110 and 120 and side walls 13 of the post 10 and is welded in place thereto. The support plate 130 extends parallel to the front and back walls 12 and 14 and is spaced more closely to the back wall. In addition, the support plate 130 is situated to the rear of the shaped opening 15 in the front wall 12 and includes a multiplicity of tapped holes 132 into which bolts for fastening the public telephone 20 to the post 10 are threaded. Finally, the support plate 130 has an opening 135 in the center thereof through which the telephone wires for the public telephone are passed.

A partition 140 that extends between the support plate 130 and the rear wall 15 and between the opening 114 in the upper blocking plate 110 and the opening 124 in the lower blocking plate 120 provides a confined passageway for the electrical wires from the overhead source. The opening 124 in the lower blocking plate 120 communicates with the lower portion of the post 10 wherein a bracket 142 is mounted to the inside surface of the left side wall 13. The bracket 142 supports a ground lug 144, a circuit breaker 145, and an electrical socket 146 to which the electrical wires are connected.

Partitions 150 and 152 that extend between the support plate 130 and the rear wall 14 of the post 10 to the right of the partition 140 provide channels that direct the telephone wires toward the opening 135 in the support plate 130 and toward a conduit 154 beneath the opening 125 in the lower blocking plate 120. If the public telephone secured to the mounting includes a protector block, the telephone wires are fed directly to the opening 135. Otherwise, the telephone wires are fed to an enclosure 156 wherein a protector block (not shown) is mounted on a bracket 158. Wires from the protector block are then fed through the conduit 154 to the opening 135.

Figure 8:
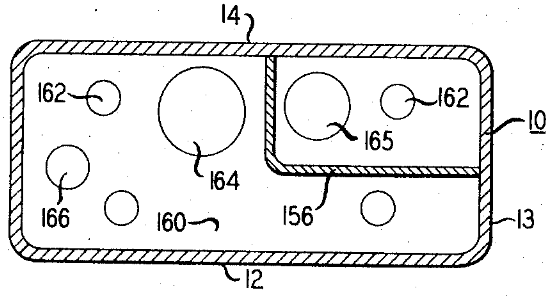
FIG. 8 is a sectional view taken along line 8—8 of FIG. 2 showing the interior construction of the lower end of the post.

As seen from FIGS. 2, 3, and 8, the lower end of the post 10 has a bottom plate 160 welded thereto that includes holes 162 for securing the post to a base (not shown). In addition, the bottom plate has holes 164 and 165 for respectively bringing in electrical and telephone wires from an underground source and a hole 166 for receiving a ground rod (not shown).

Referring again to FIG. 1, the public telephone 20 shown consists of a front cover 22, a lower housing 24 that is situated beneath the front cover and a rear housing (not shown) that is situated behind the front cover and the lower housing and extends the entire height and approximately half the depth of the telephone. The lower housing 24, which includes a coin return chute and a vault door, is permanently joined to the rear housing, there being a slightly recessed seam at their juncture. On the other hand, the front cover 22, which includes a switch hook and a dial and has a handset connected thereto by a cord, is removeably detachable from the lower housing 24 and the rear housing. The rearward and bottom edges of the front cover 22 include a raised lip that respectively overlaps the adjoining edge of the rear housing and the lower housing at the juncture therewith.

The opening 15 and the front wall of the post 10 is shaped so as to closely conform to the configuration of the top, sides, and bottom of the public telephone 20. In addition, the distance between the front wall 12 and the support plate 130 is such that when the public telephone 20 is secured to the support plate, the front wall embraces the top and sides of the front cover 22 forward of the rear edge of the raised lip and embraces the sides and bottom of the lower housing 24 forward of the seam. These surfaces are thereby protected from any prying tools.

The upper and lower blocking plates 110 and 120 afford additional protection by preventing the insertion of any prying tools or chisels into the interior portion of the post adjacent the public telephone 20 should the cap 50 or front panel 30 be removed. The juncture between the rear housing and the support plate 130 and the bolts used to secure the telephone 20 to the support plate are thereby also protected.

Figure 9:
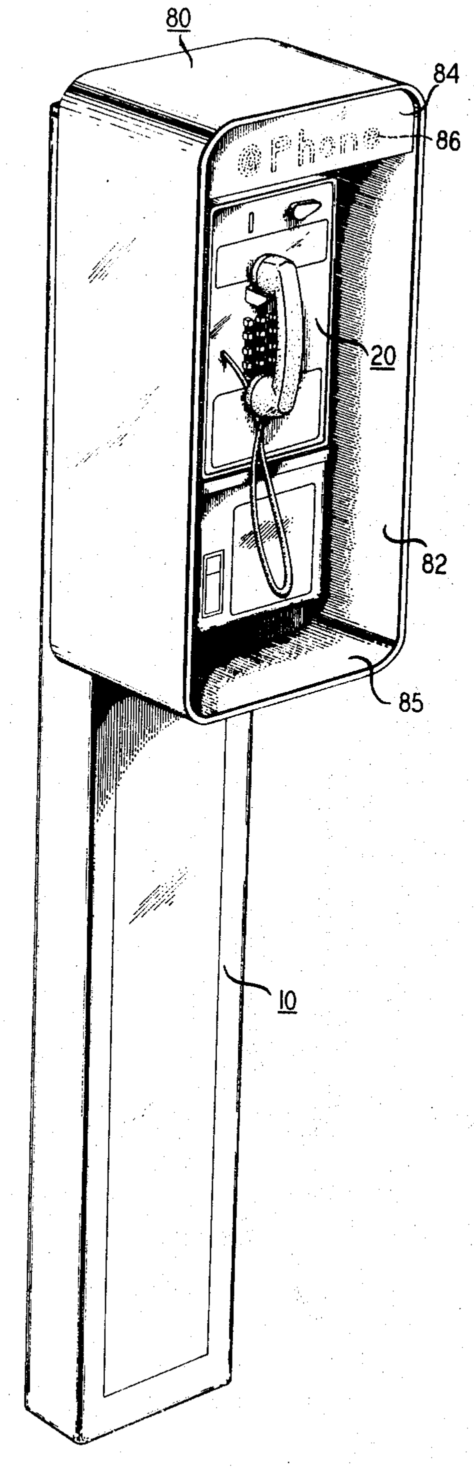
FIG. 9 is a front perpsective view of the telephone mounting with an enclosure interchanged for the shelf.

Referring to FIG. 9, a housing 80, which affords weather protection, conversational privacy, and additional security, may be interchanged with the shelf 40 without having to remove the telephone 20 or interrupt telephone service. The housing 80 is supported on the upper end of the telephone mounting and is secured to the post 10 by a multiplicity of fasteners. The lower portion of the housing 80, like the shelf 40, covers the circular opening 18 (FIG. 2) in the front wall 12 of the post.

The housing 80 comprises a rugged unitary aluminum ring-like enclosure 82 that encircles the telephone 20 a short distance from the top, bottom and sides thereof. In addition, the enclosure 82 extends forward of the front wall 12 of the post 10 a distance that is approximately twice the depth of the post.

A light fixture unit 84 is mounted to the upper end of the enclosure 82, and it provides illumination of the telephone 20, a shelf 85 at the bottom of the enclosure, and a phone sign 86 that is part of the light fixture unit. Power for the light fixture unit 84 is provided by a plug-ended cord (not shown) that is fed through a channel along the side of the housing 80 and through the circular opening 18 (FIG. 2) in the front of the post 10 for connection to the socket box 146 mounted within the post. The plug-ended cord and socket box permit the housing 80 to be interchanged with some other housing without requiring the services of an electrician.

Although but one embodiment of the telephone mounting has been shown and described, it will be understood that it is but illustrative and that various modifications may be made therein without departing from the scope and spirit of this invention as defined in the appended claims.

What is claimed is:

1. A vandal resistant mounting for a public telephone including a rear housing and a front cover detachably secured to the rear housing, the telephone mounting comprising:

a tubular post including front and back walls spaced from one another, the front wall of the post having an opening therein that closely conforms to the peripheral configuration of the public telephone, and the interior of the post including support means to the rear of the opening in the front wall to which the rear housing of the public telephone is secured, the support means extending parallel to the front wall and the distance between the front surface of the support means and the front surface of the front wall being greater than the distance between the rear surface of the rear housing and the rear edge of the front housing of the public telephone accommodated by the opening in the post.

2. A telephone mounting as in claim 1 wherein the post further includes blocking means for preventing access from the interior of the post to a public telephone secured to the support means, the blocking means substantially closing off the interior of the post immediately above and below the opening in the front wall.

3. A telephone mounting as in claim 2 wherein the support means comprises a plate permanently affixed to the interior of the post, the plate extending between the blocking means of the post.

4. A telephone mounting as in claim 3 wherein the blocking means comprises an upper and a lower blocking plate, both of which extend transverse to the length of and are permanently affixed to the post.

5. A telephone mounting as in claim 2 wherein the support means is spaced from the back wall of the post and channelling means is provided between the support means and the back wall for separating electrical and telephone wires fed into the telephone mounting and for directing the wires along separate paths.

6. A telephone mounting as in claim 5 wherein the post includes a lower portion that contains electrical circuit connecting means and the front wall of the lower portion includes an opening for providing access to the circuit connecting means, the telephone mounting further including a front panel for covering the opening in the lower portion.

7. A telephone mounting as in claim 1 wherein the post is a unitary member that is rectangular in shape.

8. A telephone mounting as in claim 1 further including a housing supported on the upper end thereof for providing conversational privacy for the user of the public telephone, the housing being detachably supported on the telephone mounting independent of the support for the public telephone.

9. A telephone mounting as in claim 8 wherein the housing includes a unitary ring-like enclosure that encircles the opening in the front wall for accommodating the public telephone and extends forward of the front wall a distance greater than the depth of the post.

10. A telephone mounting as in claim 9 wherein the housing includes a light fixture unit at the upper end of the enclosure, the light fixture unit being plug-ended.

* * * * *